United States Patent
Kritzer et al.

(10) Patent No.: US 12,388,130 B2
(45) Date of Patent: Aug. 12, 2025

(54) ELECTROCHEMICAL ENERGY STORAGE CELL

(71) Applicant: Carl Freudenberg KG, Weinheim (DE)

(72) Inventors: Peter Kritzer, Forst (DE); Marina Nussko, Mannheim (DE); Ernst Osen, Birkenau (DE); Armin Striefler, Oehringen (DE); Jens Hofmann, Darmstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 1113 days.

(21) Appl. No.: 17/297,496

(22) PCT Filed: Nov. 14, 2019

(86) PCT No.: PCT/EP2019/081295
§ 371 (c)(1),
(2) Date: May 27, 2021

(87) PCT Pub. No.: WO2020/109014
PCT Pub. Date: Jun. 4, 2020

(65) Prior Publication Data
US 2022/0037712 A1    Feb. 3, 2022

(30) Foreign Application Priority Data
Nov. 28, 2018   (DE) .................... 10 2018 130 173.1

(51) Int. Cl.
*H01M 10/654*    (2014.01)
*H01M 10/0525*   (2010.01)
(Continued)

(52) U.S. Cl.
CPC ..... *H01M 10/654* (2015.04); *H01M 10/0525* (2013.01); *H01M 10/0587* (2013.01);
(Continued)

(58) Field of Classification Search
None
See application file for complete search history.

(56) References Cited

U.S. PATENT DOCUMENTS

2005/0026014 A1   2/2005  Fogaing
2012/0270075 A1   10/2012 Fujimura
(Continued)

FOREIGN PATENT DOCUMENTS

CN     207587875 U     7/2018
DE     102008025884 A1 12/2009
(Continued)

OTHER PUBLICATIONS

DE102011077295A1—machine translation (Year: 2012).*
WO2011117221A1—machine translation (Year: 2011).*

*Primary Examiner* — Haroon S. Sheikh
(74) *Attorney, Agent, or Firm* — LEYDIG, VOIT & MAYER, LTD.

(57) ABSTRACT

An electrochemical energy storage cell includes: a housing; and at least one cell coil accommodated in the housing. The housing is closed at at least one end face by a cover. The cover forms a part of the housing. At least one insulation element is arranged between the at least one cell coil and the housing. The at least one insulation element is made of an electrically insulating and thermally conductive material.

19 Claims, 11 Drawing Sheets

(51) Int. Cl.
  *H01M 10/0587* (2010.01)
  *H01M 10/647* (2014.01)
  *H01M 10/653* (2014.01)
  *H01M 10/659* (2014.01)
  *H01M 50/103* (2021.01)
  *H01M 50/474* (2021.01)
  *H01M 50/486* (2021.01)
  *H01M 50/586* (2021.01)
  *H01M 50/593* (2021.01)

(52) U.S. Cl.
  CPC ....... *H01M 10/647* (2015.04); *H01M 10/653* (2015.04); *H01M 10/659* (2015.04); *H01M 50/103* (2021.01); *H01M 50/474* (2021.01); *H01M 50/486* (2021.01); *H01M 50/586* (2021.01); *H01M 50/593* (2021.01)

(56) References Cited

U.S. PATENT DOCUMENTS

| | | | |
|---|---|---|---|
| 2013/0288093 | A1 | 10/2013 | Nakagiri |
| 2013/0330602 | A1* | 12/2013 | Tsutsumi ............ H01M 50/567 429/211 |
| 2016/0359209 | A1 | 12/2016 | Schmiederer |
| 2018/0301771 | A1 | 10/2018 | Jennrich et al. |
| 2018/0323475 | A1* | 11/2018 | Pasma ................. H01M 50/116 |
| 2019/0288247 | A1 | 9/2019 | Jennrich et al. |
| 2020/0377690 | A1* | 12/2020 | Ootsuki ............. H01M 50/105 |

FOREIGN PATENT DOCUMENTS

| | | | | |
|---|---|---|---|---|
| DE | 102011077295 A1 | * | 12/2012 | ........ H01M 10/0587 |
| DE | 102013220171 A1 | | 4/2015 | |
| DE | 102013226743 A1 | | 6/2015 | |
| DE | 102014222173 A1 | | 5/2016 | |
| DE | 102015219280 A1 | | 4/2017 | |
| DE | 102016220092 A1 | | 4/2018 | |
| JP | S54136520 A | | 10/1979 | |
| JP | 2001185225 A | | 7/2001 | |
| JP | 2007500920 A | | 1/2007 | |
| JP | 2011108507 A | | 6/2011 | |
| JP | 2012227072 A | | 11/2012 | |
| JP | 2013026355 A | | 2/2013 | |
| JP | 2016015248 A | | 1/2016 | |
| JP | 2016210957 A | | 12/2016 | |
| WO | WO 2011117221 A1 | | 9/2011 | |
| WO | WO 2018199604 A1 | | 11/2018 | |

* cited by examiner

ELECTROCHEMICAL ENERGY STORAGE CELL

CROSS-REFERENCE TO PRIOR APPLICATIONS

This application is a U.S. National Phase application under 35 U.S.C. § 371 of International Application No. PCT/EP2019/081295, filed on Nov. 14, 2019, and claims benefit to German Patent Application No. DE 10 2018 130 173.1, filed on Nov. 28, 2018. The International Application was published in German on Jun. 4, 2020 as WO 2020/109014 under PCT Article 21(2).

FIELD

The invention relates to an electrochemical energy storage cell comprising at least one cell coil which is accommodated in a housing, the housing being closed at at least one end face by a cover.

BACKGROUND

Such an energy storage cell is known, for example, from DE 10 2008 025 884 A1 and is widely used in the art. Such an energy storage cell is often circular in plan view and is therefore also known as a round cell. Round cells are used, for example, to power battery-operated hand tools. However, it is also known to combine a multiplicity of the round cells into one unit, which in turn is suitable for providing energy for an electric vehicle. In addition, prismatic cells are also known. In the case of round cells and in the case of prismatic cells, the cell coil is located in a solid, cylindrical or cuboidal housing made of solid material, usually aluminum or stainless steel.

Due to electrochemical reactions in the interior of the cell coil, heat is released during charging or discharging of the energy storage cell. Depending on operating conditions, it may be necessary to dissipate the heat generated in the interior of the cell coil. So far, this has been done by means of a cooling device which is usually assigned on the outside in the region of the base or the side wall of the housing.

Due to the design, however, the heat flow in the interior of the cell coil along one layer is significantly greater than through one or in particular a plurality of layers. As a result, in the case of a cell coil arranged vertically in a housing, the heat flow in the direction of the base and cover of the housing is significantly greater than in the direction of the lateral surface of the housing. This limits the possibility of heat dissipation via a cooling device assigned to the side wall.

SUMMARY

In an embodiment, the present invention provides an electrochemical energy storage cell, comprising: a housing; and at least one cell coil accommodated in the housing, wherein the housing is closed at at least one end face by a cover, wherein the cover forms a part of the housing, wherein at least one insulation element is arranged between the at least one cell coil and the housing, and wherein the at least one insulation element comprises an electrically insulating and thermally conductive material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
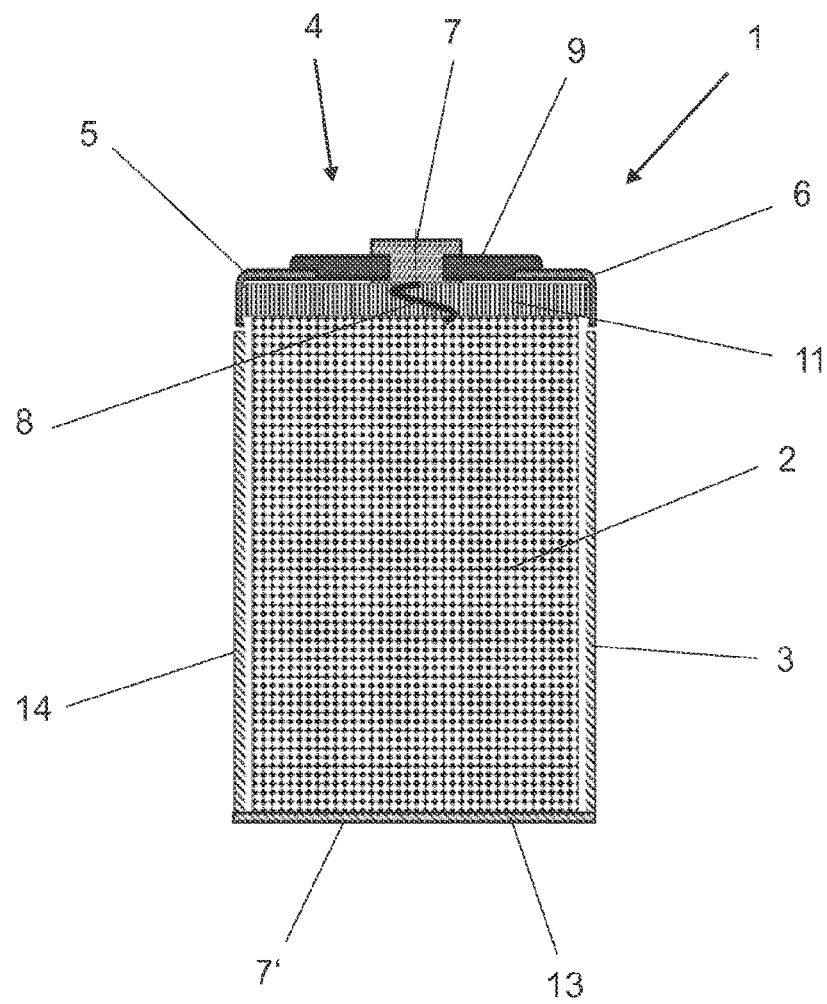
FIG. 1 an energy storage cell with an insulation element in section.

In an embodiment, the present invention develops the electrochemical energy storage cell in such a way that improved heat dissipation results.

In an embodiment, the present invention provides an electrochemical energy storage cell comprising at least one cell coil which is accommodated in a housing, wherein the housing is closed at at least one end face with a cover which forms a part of the housing, wherein an insulation element is arranged between cell coil and housing, wherein the insulation element is formed from electrically insulating and at the same time thermally conductive material. In this respect, in the present invention, the 'insulation' part of the term 'insulation element' relates exclusively to an electrical insulation.

The electrically insulating properties of the insulation element prevent an electrical short circuit between the components of the cell coil and the housing. For example, the housing component that is the cover is usually assigned a terminal section which is connected to a tab of the cell coil. In this respect, the insulation element has the effect that an electrically conductive connection between the cover, or the terminal section of the cover, and the cell coil is provided only via the tab. Furthermore, the insulation element prevents an electrical short circuit between the individual layers of the coil.

Due to the thermally conductive embodiment of the insulation element, heat generated in the cell coil can be transported in the direction of the insulation element and passed through the insulation element in the direction of the cover, the side wall of the housing assigned to the insulation element, or the base. The heat transported through the insulation element can be dissipated via a cooling device arranged on the outside in the corresponding regions of the energy storage cell. Due to the fact that heat flow in the interior of the cell coil is significantly greater in the axial direction than in the radial direction, the insulation element can absorb and convey a large amount of heat. This enables an effective cooling of the cell coil.

The arrangement of the cell coil in the case of round cells is usually vertical on account of the shape of round cells. The electrical terminal sections can be configured in such a way here that the two terminal sections and their connections point in one direction, for example in the direction of the cover. It is also conceivable for the two terminal sections to face in opposite directions, one terminal section facing in the direction of the cover and one terminal section facing in the direction of the base. In prismatic cells, the cell coil can likewise be arranged vertically in the housing. In this case, especially in larger prismatic cells, the two terminal sections usually face in the direction of the cover. A plurality of parallel cell coils can also be arranged in a housing. Alternatively, it is also possible to arrange the cell coils transversely in the housing. In this case, the tabs project in the direction of the side wall of the housing and are diverted within the housing in the direction of the terminal sections arranged in the cover.

The insulation element is preferably designed in such a way that the space between cell coil and housing, in particular between cell coil and cover, is filled. In this case, the insulation element contacts not only the end face of the cell coil but also the inside of the cover and the side wall of the housing. The direct contact of these components results in an unimpeded heat flow between cell coil and housing or cover.

The insulation element preferably has a thermal conductivity of at least 0.5 W/(m·K). The thermal conductivity is particularly preferably at least 1 W/(m·K). An insulation element with such a thermal conductivity enables an effective temperature control of the cell coil, or an effective heat dissipation of the heat generated in the cell coil.

At low outside temperatures, it is also conceivable, via a heat source arranged externally on the energy storage cell, to introduce heat into the cell coil via the insulation element in order to allow the temperature of the cell coil to be controlled into the region of optimum capacitance. Heating can be particularly relevant in the case of those types of energy storage cells that deliver their full performance only at higher temperatures. This is the case, for example, with solid-state batteries. A higher temperature is usually required here for improved ion conductivity through the solid electrolyte.

In addition to the temperature control between the interior of the cell and the exterior of the cell, the insulation element according to the invention also contributes to homogenization of the temperature within the cell itself. For example, the temperature of the interior of the cell coil may better match the temperature outside the cell coil. Different aging of the two regions can thereby be avoided.

The insulation element is preferably made of swellable material. In the case of sealing elements, the choice of material has usually been such that a sealing element swells as little as possible with regard to the media to be sealed.

In the present embodiment, however, it has surprisingly proved to be advantageous if the insulation element undergoes a certain swelling after installation in the housing and, in particular, after contact with the electrolyte which surrounds the cell coil. The swelling process makes it possible for the insulation element to fill out the space between cell coil, cover and side wall of the housing. This gives direct and immediate contact of the insulation element with the adjacent components and improves the thermal flux.

The insulation element can be made of an elastomeric material. An insulation element made of elastomeric material can adapt itself to the shape of the adjacent components and thus allow optimum filling-out of the available space.

The insulation element may be made of a silicone-based elastomer. Advantageous silicone-based elastomers are, for example, silicone rubber (VMQ) or fluorinated silicone rubber (F-VMQ). Silicone-based elastomers on the one hand are elastic materials and make it possible to produce a flexible insulation element. On the other hand, silicone materials swell upon contact with a multiplicity of electrolytes in electrochemical energy storage cells, for example with the electrolyte of a lithium-ion battery. By contact of the silicone-based elastomer with the electrolyte which is adjacent to the cell coil in the housing and which surrounds the cell coil, the insulation element swells up and increases in volume. As a result, the insulation element can completely fill out the space between the cover, cell coil and side wall of the housing and ensure a form fit.

The insulation element may be made of a polyolefin-based elastomer. A particularly preferred polyolefin-based elastomer is butyl/isobutylene rubber (IIR). IIR is chemically stable, especially with regard to electrolytes. Furthermore, IIR can be designed such that upon contact with electrolytes and the like, the release of disruptive substances, for example plasticizers, is reduced. Another polyolefin-based elastomer is ethylene propylene diene monomer (EPDM). EPDM is also chemically stable with respect to electrolytes.

In principle, it is advantageous if the insulation element is made of a polymeric material. Materials based on fluororubber (FKM), polyacrylate rubber (ACM) may also be considered as further materials. In principle, the use of thermoplastic elastomers, for example based on polyolefins, polyamides or polyesters, is also conceivable.

In addition, after completion of the swelling process, the insulation element bears with preloading against the adjacent components, which improves thermal conductivity between cell coil, insulation element and cover, or the lateral surface of the housing.

The thermal conductivity of the insulation element can be improved by equipping the insulation element with thermally conductive particles. Electrically non-conductive mineral particles preferably come into consideration here as thermally conductive particles. Such thermally conductive particles are, for example, particles of aluminum oxide ($Al_2O_3$), aluminum oxide hydroxide (AlOOH), aluminum hydroxide ($Al(OH)_3$), magnesium hydroxide ($Mg(OH)_2$), magnesium oxide (MgO), aluminum nitride (AlN) or boron nitride (BN). Oxides, hydroxides or nitrides of other base metals are also conceivable.

Although thermally conductive particles in the form of metal hydroxides or oxyhydroxides generally result in a lower thermal conductivity compared to oxides, the use of such compounds can be advantageous because when exceeding a certain temperature, they decompose endothermically while absorbing heat, thereby absorbing large amounts of energy and releasing water. Heat absorption levels of more than 1 kJ/g of material are possible. This reaction may help to buffer heat and prevent thermal runaway of the cell. Furthermore, the risk of a harmful transfer of thermal energy into neighboring cells can be reduced.

The housing can have a base, wherein a further insulation element is arranged between the base and the cell coil. The temperature control of the energy storage cell can thereby be further improved. In this embodiment, the cell coil is sandwiched between two thermally conductive insulation elements. The heat dissipation of the heat transported through the insulation elements takes place between cell coil, insulation element and housing wall.

According to another advantageous embodiment, the insulation element can surround the cell coil. Here, the insulation element is arranged between the side wall, the cylindrical wall in the case of round cells, and the cell coil. Heat transfer between cell coil and housing wall can thereby be improved in the case of lateral cooling of the energy storage cell.

The insulation element may be provided with heat-storing particles. Particularly in the case of rapid charging processes, large amounts of heat can be generated within a particularly short time. In this case, the heat-storing particles can absorb and store a portion of the heat introduced into the insulation element via the cell coil. The heat flow between insulation element and housing, or cover, base and side wall of the housing, can thereby be made more uniform. Conceivable in this respect are, for example, phase-transfer materials selected such that they have a phase transition in the upper operating temperature range of the energy storage cell. During the phase transition, the phase-transfer material can absorb thermal energy without this leading to an increase in temperature in the energy storage cell.

In this case, the insulation element functions as a heat buffer and partially absorbs heat emitted during the rapid charging process and then gradually dissipates this heat to the housing of the energy storage cell. In this way, the occurrence of temperature peaks can be reduced.

This advantageous effect of heat storage emerges in particular when the heat-storing particles take the form of phase-change material. Advantageous heat-storing particles in the form of change material are, for example, waxes present in capsule form or organic or inorganic salts. The heat-storing particles taking the form of phase-change material preferably have a phase transition temperature in the range from 30° C. to 50° C., preferably 40° C.

Insulation elements which consist of a compressible structure are also conceivable. These can, for example, be nonwovens in whose matrix ceramic particles are incorporated.

Figure 2:
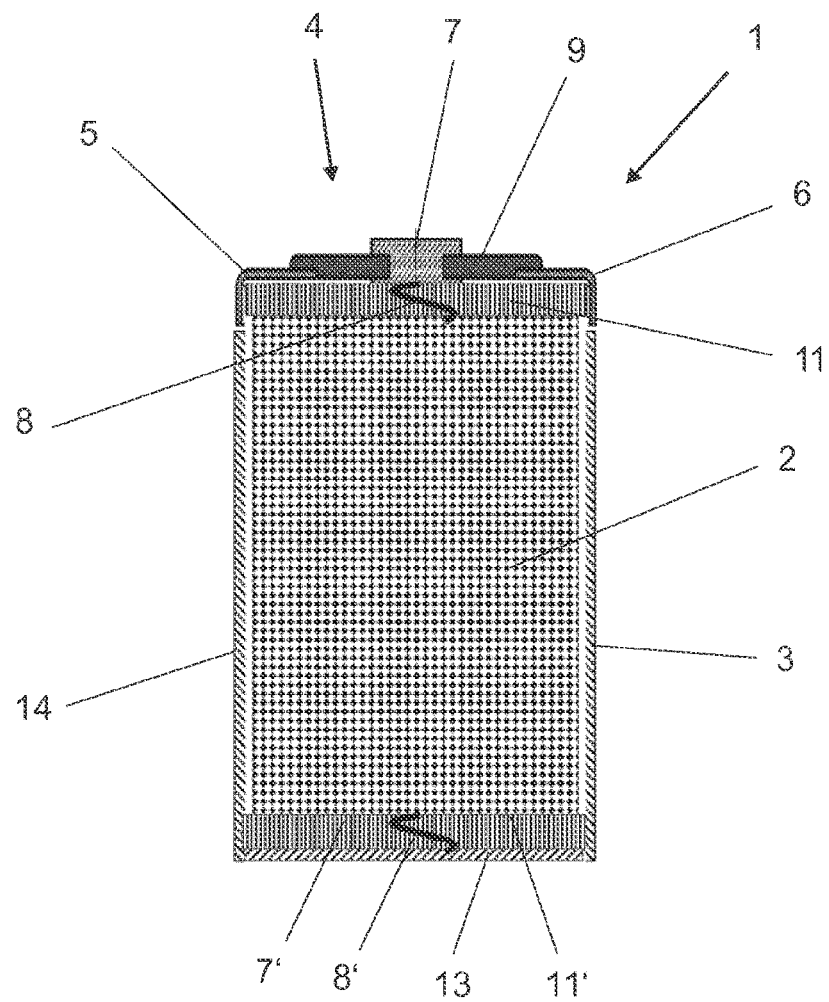
FIG. 2 an energy storage cell with two insulation elements in section.
Figure 3:
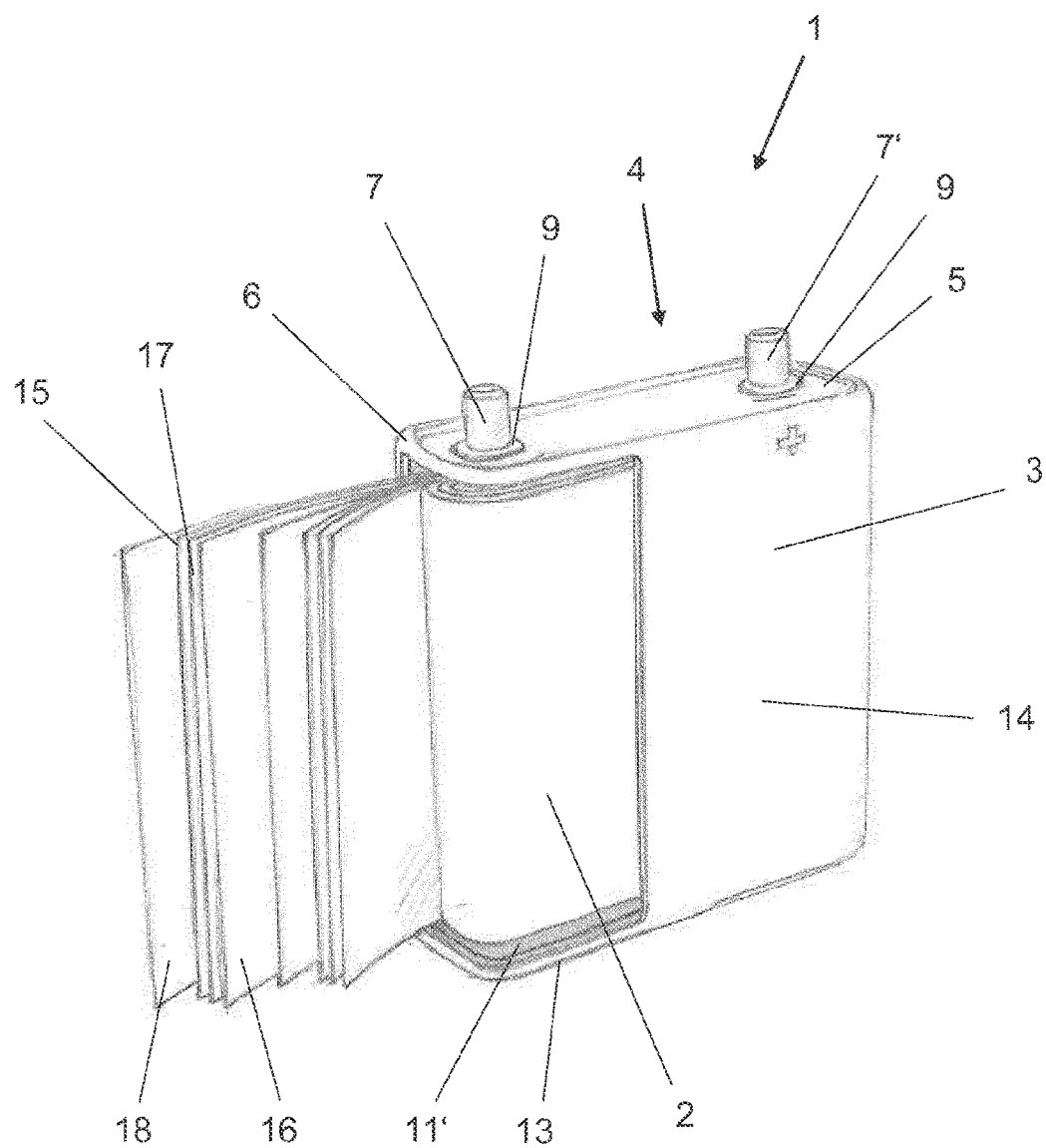
FIG. 3 a first embodiment of an energy storage cell in the form of a prismatic cell.
Figure 4:
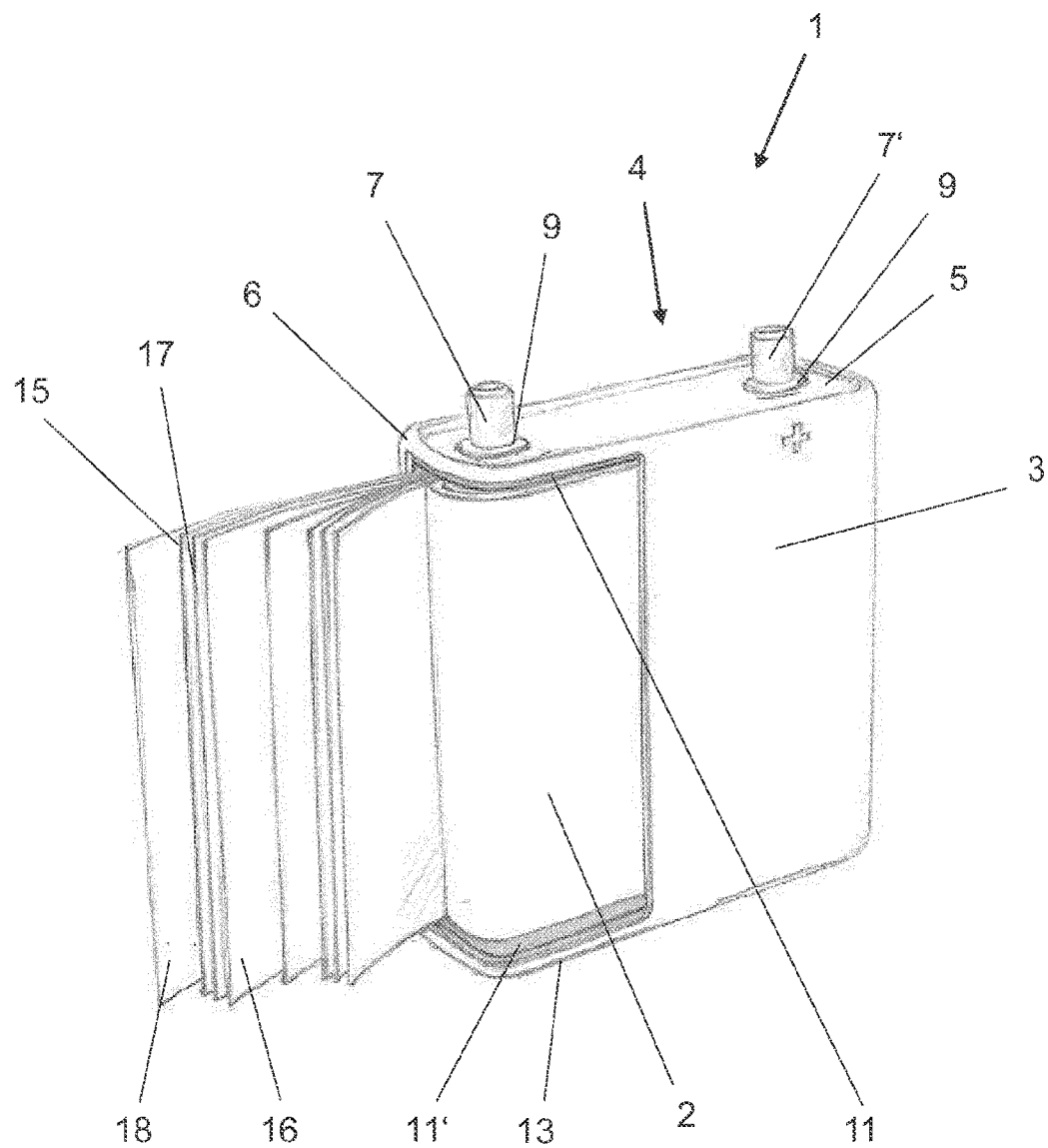
FIG. 4 a second embodiment of an energy storage cell in the form of a prismatic cell.
Figure 5:
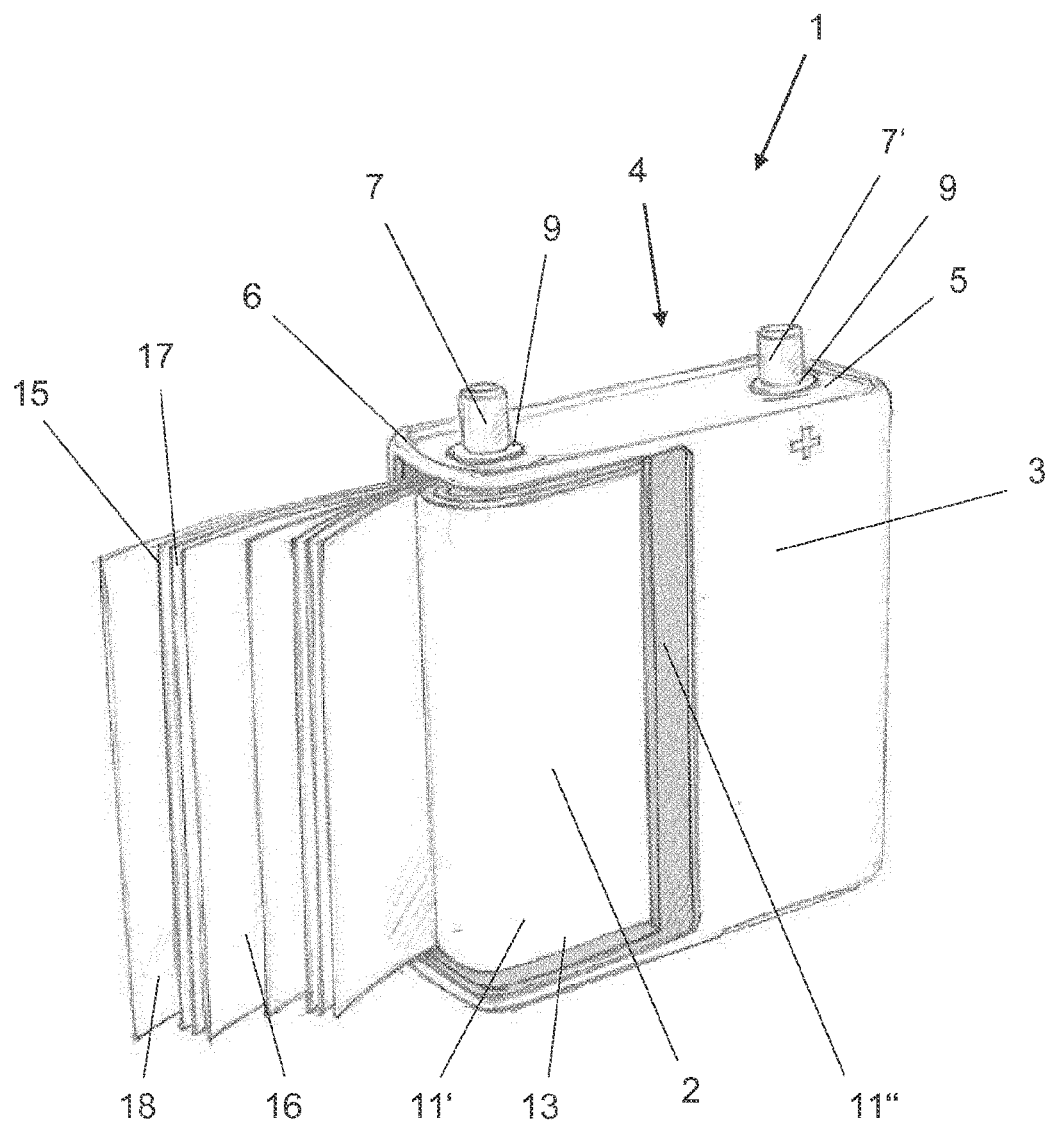
FIG. 5 a third embodiment of an energy storage cell in the form of a prismatic cell.

FIGS. 1 and 2 show an electrochemical energy storage cell 1 in the form of a round cell. FIGS. 3 to 5 show an electrochemical energy storage cell 1 in the form of a prismatic cell.

In the aforementioned exemplary embodiments, the energy storage cell 1 comprises a cell coil 2 which is accommodated in a housing 3. If the energy storage cell 1 takes the form of a lithium-ion battery, the cell coil 2 comprises two current conductors, namely an anode 15 and a cathode 17, as well as two separators 16, 18, wherein the current conductors 15, 17 are separated from each other by the separators 16, 18.

An active material is applied to the current conductors 15, 17, and the two current conductors 15, 17 separated by the separators 16, 18 are wound up into a round structure, the cell coil 2.

The housing 3 is made of metallic material and is cylindrical in the embodiments according to FIG. 1 and FIG. 2 and is cuboidal in the embodiment according to FIG. 3. At one end face, the housing 3 has a base 13 formed of the same material as and integrally with the side wall 14. At the end face 4 opposite the base 13, the housing 3 is closed by a cover 5.

The cover 5 has a fastening section 6 for fastening the cover 5 to the housing 3. In addition, the cover 5 has a terminal section 7 for contacting a tab 8 of the cell coil 2. The second tab 8' of the cell coil 2 is assigned to the base 13 of the housing 3.

The cover 5 has a fastening section 6 for fastening the cover 5 to the housing 3. The fastening section 6 and the terminal section 7 are connected to each other via a compensation element 9. The compensation element 9 is of an elastic and electrically insulating design. In the present embodiments, the compensation element 9 is made of elastomeric material.

In the embodiment according to FIG. 1, an insulation element 11 is arranged between cell coil 2 and cover 5. The insulation element 11 is made of insulating and thermally conductive material. In the present embodiments, the base material of the insulation element 11 is a silicone rubber which is formed with thermally conductive particles consisting of a metal hydroxide, aluminum hydroxide in the present case. Due to this design, the insulation element 11 has a thermal conductivity of 1.5 W/(m·K). On the basis of the materials currently available, a thermal conductivity of the insulation element of 10 W/(m·K) can be achieved; a thermal conductivity of up to 75 W/(m·K) is conceivable. Alternatively, the base material of the insulation element 11 is made of IIR.

In order to absorb the temperature peaks occurring during rapid charging processes, the insulation element 11 is also provided with particulate phase-change material. This material in the present case consists of an inorganic salt. In an alternative embodiment, the insulation element 11 is provided with encapsulated phase-change material based on an organic wax.

In particular in connection with a cell coil 2 of a lithium-ion battery, an interaction of the electrolyte surrounding the cell coil 2 with the silicone elastomer of the insulation element 11 causes a swelling of the silicone elastomer. In this case, the insulation element 11 bears flush against the cell coil 2, the inside of the cover 5 and the side wall of the housing 3. This ensures that the insulation element 11 contacts the cell coil 2, the cover 5 and the housing 3. This ensures a heat flow between cell coil 2, the insulation element 11 and the cover 5 or housing 3. The cell coil 2 is arranged directly on the base 13 of the housing 3.

FIG. 2 shows an embodiment of an energy storage cell 1 according to FIG. 1, wherein a further insulation element 11' is arranged between cell coil 2 and base 13. The further insulation element 11' is also formed like the insulation element 11 arranged between the cell coil 2 and the cover 5. A tab 8, 8' projects through both insulation elements 11, 11' so that the cell coil 2 contacts the terminal sections 7, 7' of cover 5 and base 13.

In plan view, the cover 5 is circular. The terminal section 7 is arranged centrally and in the middle of the cover 5 and is surrounded by the compensation element 9. The compensation element 9 is connected to the terminal section 7 in a form-fitting and material-bonding manner. The fastening section 6 has a disk-shaped section, in the opening of which the compensation element 9 and the terminal section 7 are arranged. The compensation element 9 is firmly bonded in the region of the edge of the opening of the fastening section 6. The fastening section 6 also has a cylindrical section which rests on the end-face edge of the housing 3. In the region of the two touching edges, cover 5 and housing 3 are connected to each other in a material-bonding manner by means of electromagnetic pulse-forming.

FIG. 3 shows a first alternative embodiment of an electrochemical energy storage cell 1 in the form of a prismatic cell. In this embodiment, the two terminal sections 7, 7' are arranged in the cover 5. A first insulation element 11' is arranged between cell coil 2 and base 13. The two terminal sections 7, 7' are connected via compensation elements 9, 9' to the fastening section 6 of the cover 5. The compensation elements 9, 9' are elastic and electrically insulating so that the two terminal sections 7, 7' are electrically insulated from each other.

FIG. 4 shows a first alternative embodiment of an electrochemical energy storage cell 1 in the form of a prismatic cell. In this embodiment, the two terminal sections 7, 7' are arranged in the cover 5. A first insulation element 11 is arranged between cell coil 2 and cover 5 and a further insulation element 11' is arranged between cell coil 2 and base 13. The two terminal sections 7, 7' are connected via compensation elements 9, 9' to the fastening section 6 of the cover 5. The compensation elements 9, 9' are elastic and electrically insulating so that the two terminal sections 7, 7' are electrically insulated from each other.

FIG. 5 shows a first alternative embodiment of an electrochemical energy storage cell 1 in the form of a prismatic cell. In this embodiment, the two terminal sections 7, 7' are arranged in the cover 5. A first insulation element 11 is arranged between cell coil 2 and cover 5, a second insulation element 11' is arranged between cell coil 2 and base 13, and a third insulation element 11" is arranged between cell coil 2 and the side wall 14 of the housing. The two terminal sections 7, 7' are connected via compensation elements 9, 9' to the fastening section 6 of the cover 5. The compensation elements 9, 9' are elastic and electrically insulating so that the two terminal sections 7, 7' are electrically insulated from each other.

Figure 6:
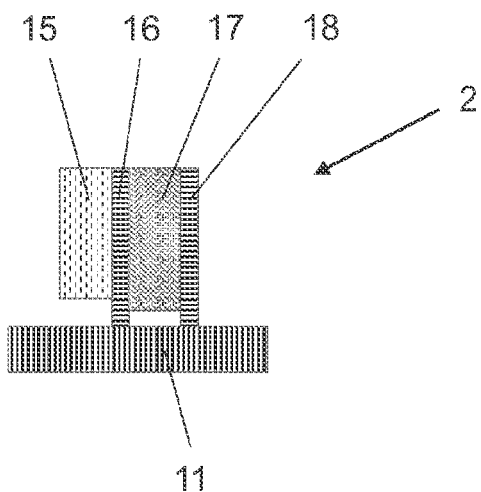
FIG. 6 the contact region between cell coil and insulation element in detail.
Figure 6:
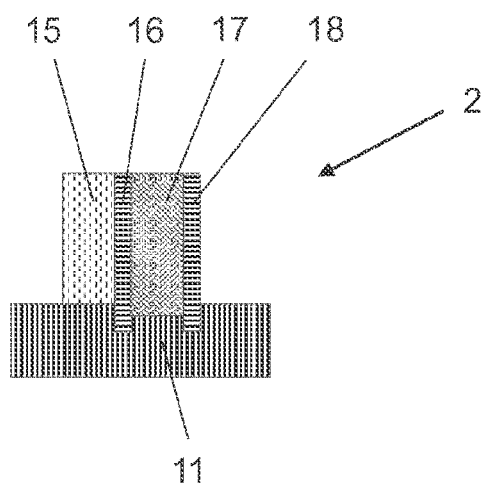

FIG. 6 shows in detail the contact region between cell coil 2 and insulation element 11. The cell coil 2 comprises a spirally wound arrangement of a planar anode 15, a planar first separator 16, a planar cathode 17 and a planar second separator 18. These planar components are wound spirally to form a cell coil 2. Due to the choice of material, at least the separators 16, 18 have a relatively poor thermal conductivity. In this respect, thermal conductivity across the separators 16, 18 is much poorer. In the embodiment shown above, immediately after assembly, only the end face of the insulation element 11 bears against the separators 16, 18. As a result of the contact with the electrolyte surrounding the cell coil 2, the material of the insulation element 11 swells so that, as shown in the lower illustration, with its end face, it finally touches the anode 15, the two separators 16, 18 and the cathode 17. In this case, it is particularly advantageous that the heat emitted by the anode 15 and the cathode 17 can be absorbed and dissipated by the insulation element 11.

Figure 7:
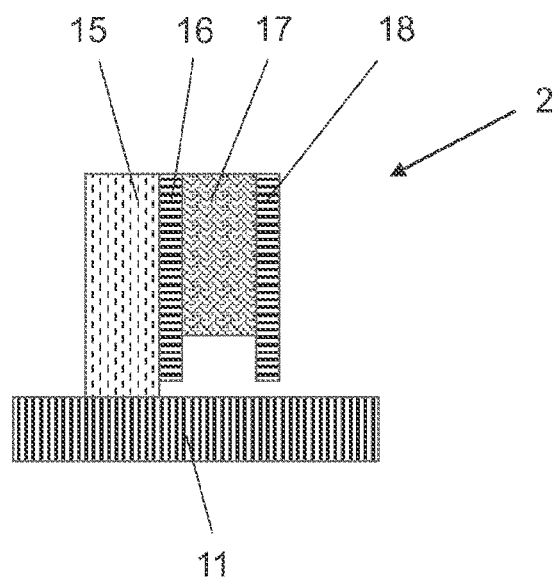
FIG. 7 the contact region between cell coil and insulation element in detail according to a second exemplary embodiment.
Figure 7:
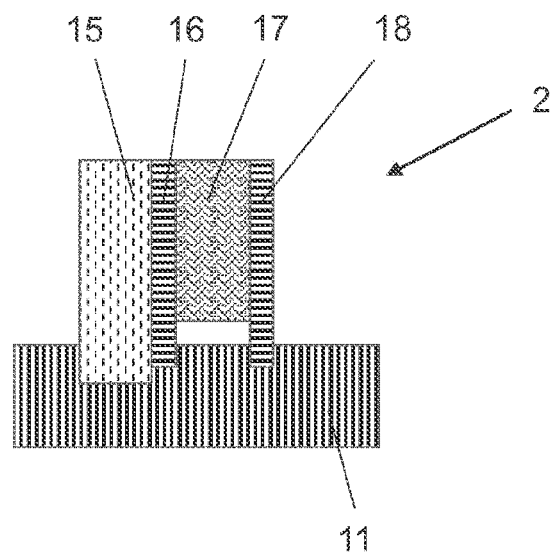

FIG. 7 shows an alternative embodiment of the cell coil 2 according to FIG. 4. In the present embodiment, the anode 15 projects with its end face beyond the first separator 16. Such an embodiment allows better utilization of space and thus an increase in the capacity of the energy store 1. However, this is only possible because the insulation element 11 at its end face surrounds the anode 15 and thereby prevents a short circuit between anode 15 and cathode 17, for example due to dendrite formation. As a result of the contact with the electrolyte surrounding the cell coil 2, the material of the insulation element 11 swells so that, as shown in the lower illustration, with its end face, it finally touches the anode 15, the two separators 16, 18 and the cathode 17. In this case, it is particularly advantageous that the heat emitted by the anode 15 and the cathode 17 can be absorbed and dissipated by the insulation element 11. In the present embodiment, the anode 15 is embedded at its end face by the insulation element 11. This embodiment thus results in direct thermal contact of the thermally conductive anode 15 with the insulation element 11.

Figure 8:
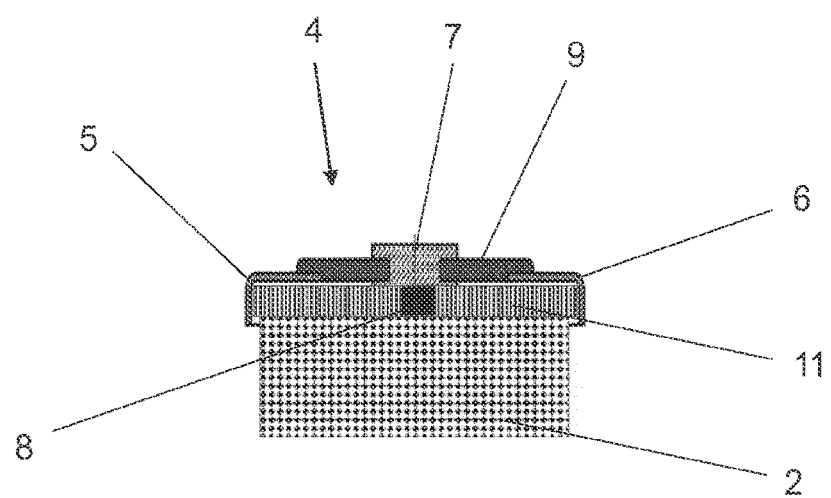
FIG. 8 the cover region of an energy storage cell in detail.

FIG. 8 shows an alternative embodiment of an insulation element 11. The tab 8 is integrated into the insulation element 11. According to an advantageous embodiment, the tab 8 takes the form of a metallic insert onto which the elastomeric material of the insulation element 11 is injection-molded. However, it is also conceivable to form the insulation element 11 from a compound of different materials, wherein the region forming the tab 8 comprises electrically conductive polymers.

Figure 9:
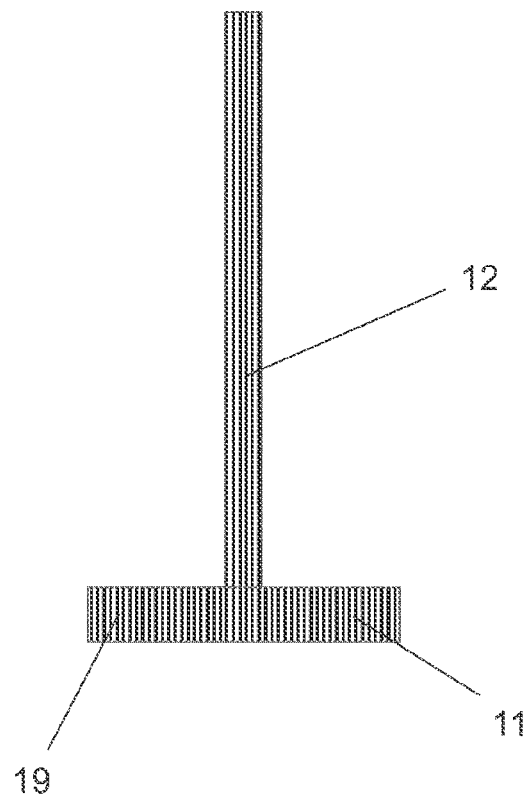
FIG. 9 an insulation element with a rod-shaped central part in detail.

FIG. 9 shows an insulation element 11 having a base 19 and a rod-shaped extension 12. The extension 12 thereby forms the core of the cell coil 2 and simplifies the production of the cell coil 2. Furthermore, the extension 12 improves heat transfer from the core of the cell coil 2 into the components of the housing 3 that are adjacent to the insulation element 11. In the case of energy storage cells 1 in the form of round cells, the extension 12 is preferably rotationally symmetrical; in the case of energy storage cells 1 in the form of prismatic cells, the extension 12 is preferably axially symmetrical.

Figure 10:
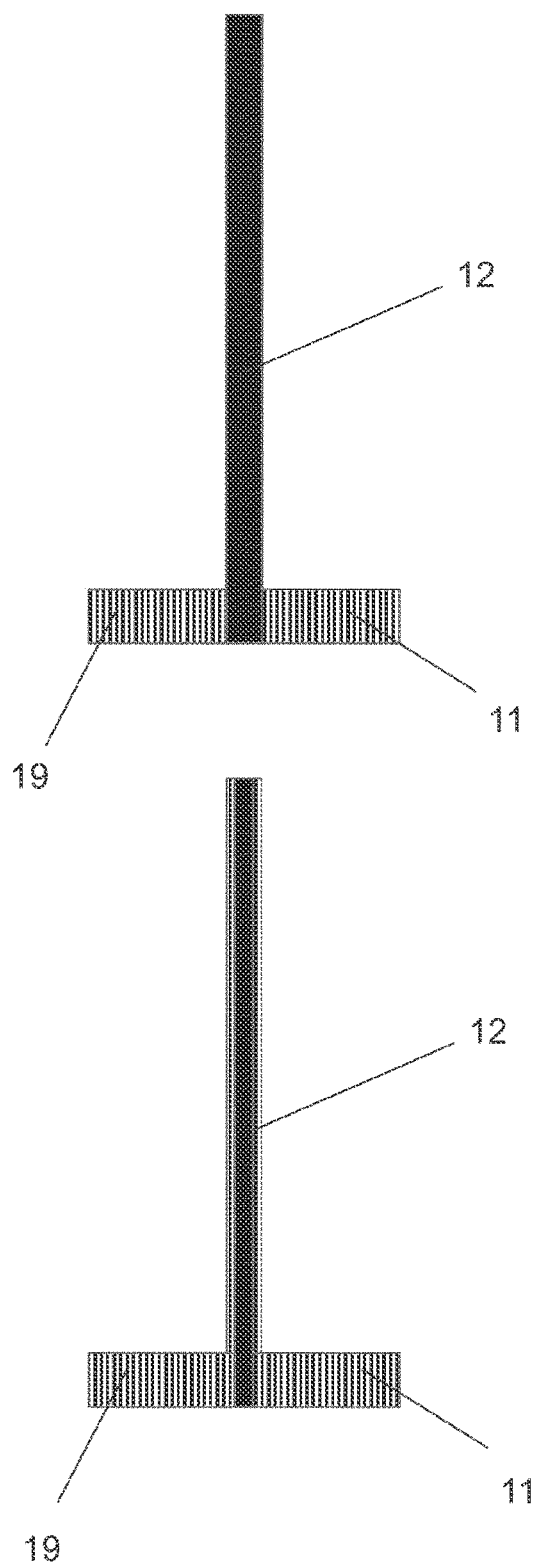
FIG. 10 an insulation element with a rod-shaped central part made of rigid material.

FIG. 10 shows a development of the insulation element 11 according to FIG. 7, wherein in the upper embodiment, the material of the extension 12 differs from the base 19 of the insulation element 11. In the lower embodiment, the extension 12 comprises a core made of a different material, preferably a more rigid material, surrounded by the elastomeric material of the base 19.

Figure 11:
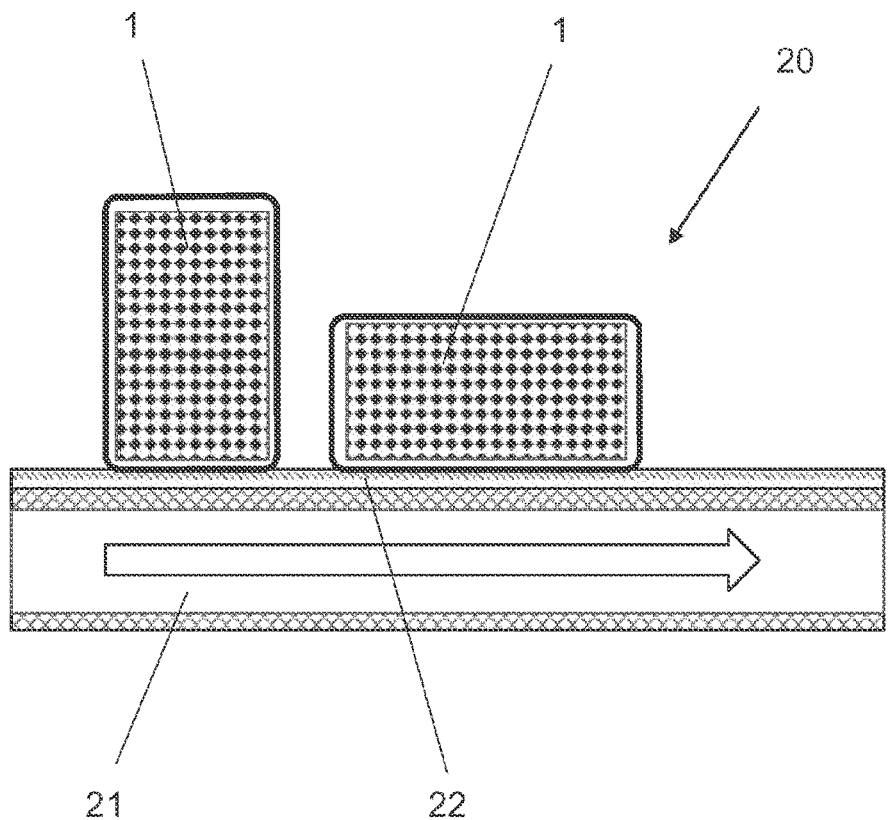
FIG. 11 a battery system with a plurality of energy storage cells.

FIG. 11 shows a battery system 20 with a plurality of energy storage cells 1 according to the previously described embodiments. The energy storage cells 1 are arranged on a device 21 for controlling the temperature of the energy storage cells 1. In this case, the energy storage cells 1 can be arranged horizontally or vertically on the device 21. In the present embodiment, the device 21 is a duct through which a temperature control liquid flows. In this case, the duct consists of a solid material of plastic or metal. A heat transfer element 22 made of elastic material is arranged between the duct and the energy storage cell 1. A good heat transfer between cell coil 2, insulation element 11, housing 3, heat transfer element 22 and the device 21 with duct and temperature control liquid is thus provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrochemical energy storage cell, comprising:
a housing; and
at least one cell coil accommodated in the housing,
wherein the housing is closed at at least one end face by a cover,
wherein the cover forms a part of the housing,
wherein at least one insulation element is arranged between the at least one cell coil and the housing,
wherein the at least one insulation element comprises an electrically insulating and thermally conductive material,
wherein the at least one insulation element has a thermal conductivity of at least 0.5 W/(m·K), and
wherein the at least one insulation element comprises swellable material, wherein the at least one insulation element is configured to swell upon contact with an electrolyte in the electrochemical energy storage cell, and thereby fill a space between the cover, the at least one cell coil, and the housing.

2. The electrochemical energy storage cells of claim 1, wherein the at least one insulation element comprises polymeric material.

3. The electrochemical energy storage cell of claim 1, wherein the at least one insulation element comprises elastomeric material.

4. The electrochemical energy storage cell of claim 1, wherein the at least one insulation element comprises a silicone-based elastomer.

5. The electrochemical energy storage cell of claim 1, wherein the at least one insulation element comprises a polyolefin-based elastomer.

6. The electrochemical energy storage cell of claim 1, wherein the at least one insulation element comprises thermally conductive particles.

7. The electrochemical energy storage cell of claim 6, wherein the thermally conductive particles consist of aluminum hydroxide.

8. The electrochemical energy storage cell of claim 1, wherein the housing has a base, and
wherein an insulation element of the at least one insulation element is arranged between the base and the at least one cell coil.

9. The electrochemical energy storage cell of claim 1, wherein the at least one insulation element comprises heat-storing particles.

10. The electrochemical energy storage cell of claim 9, wherein the heat-storing particles comprise phase-change material.

11. The electrochemical energy storage cell of claim 10, wherein the phase-changing material consists of an inorganic salt.

12. The electrochemical energy storage cell of claim 10, wherein the phase-changing material is an encapsulated phase-changing material based on an organic wax.

13. A battery system, comprising:
an arrangement of a plurality of electrochemical energy storage cells of claim 1.

14. The battery system of claim 13, wherein the plurality of electrochemical energy storage cells are assigned a device configured to control a temperature of the plurality of electrochemical energy storage cells.

15. A method of causing an insulation element to swell in an internal space of an electrochemical energy storage cell, the method comprising:
contacting an electrolyte with at least one insulation element of the electrochemical energy storage cell,
the electrochemical energy storage cell comprising:
a housing; and
at least one cell coil accommodated in the housing,
wherein the housing is closable at at least one end face by a cover,
wherein the cover forms a part of the housing,
wherein the at least one insulation element is arranged between the at least one cell coil and the housing,
wherein the at least one insulation element comprises an electrically insulating and thermally conductive material,
wherein the at least one insulation element has a thermal conductivity of at least 0.5 W/(m·K), and
wherein the at least one insulation element comprises swellable material that swells after contact with the electrolyte, wherein the at least one insulation element is configured to swell upon contact with an electrolyte in the electrochemical energy storage cell, and thereby fill a space between the cover, the at least one cell coil, and the housing.

16. The method of claim 15, wherein the at least one insulation element comprises a silicone-based elastomer.

17. The method of claim 15, wherein the at least one insulation element comprises a polyolefin-based elastomer.

18. The method of claim 15, wherein the at least one insulation element comprises thermally conductive particles.

19. The method of claim 15, wherein the housing of the electrochemical energy storage cell has a base, and wherein an insulation element of the at least one insulation element is arranged between the base and the at least one cell coil.

* * * * *